(12) United States Patent
Park et al.

(10) Patent No.: US 6,585,184 B1
(45) Date of Patent: Jul. 1, 2003

(54) SEAT BELT RETRACTOR FOR VEHICLES

(75) Inventors: Sang-Hee Park, Pusan-si (KR);
Chul-Hyun Cho, Seoul (KR);
Wan-Young Kim, Kyungsangnam-do (KR)

(73) Assignee: Samsong Industries, Ltd., Seoul (KR)

( * ) Notice: Subject to any disclaimer, the term of this patent is extended or adjusted under 35 U.S.C. 154(b) by 0 days.

(21) Appl. No.: 09/700,596

(22) PCT Filed: May 7, 1999

(86) PCT No.: PCT/KR99/00218
§ 371 (c)(1),
(2), (4) Date: Nov. 16, 2000

(87) PCT Pub. No.: WO99/59847
PCT Pub. Date: Nov. 25, 1999

(30) Foreign Application Priority Data

May 18, 1998 (KR) .......................................... 1998-17768

(51) Int. Cl.[7] ........................... B60R 22/38; B65H 75/48

(52) U.S. Cl. ................. 242/383.2; 242/382.6; 242/384.6

(58) Field of Search ........................... 242/383.2, 382.6, 242/384.6

(56) References Cited

U.S. PATENT DOCUMENTS

| | | | | |
|---|---|---|---|---|
| 4,619,418 A | * | 10/1986 | Butenop | 242/382.6 |
| 5,368,251 A | * | 11/1994 | Haberzeth | 242/382.6 |
| 5,765,774 A | * | 6/1998 | Maekawa et al. | 180/268 |
| 5,779,177 A | * | 7/1998 | Kielwein | 242/379.1 |

* cited by examiner

Primary Examiner—Donald P. Walsh
Assistant Examiner—Jonathan R Miller
(74) Attorney, Agent, or Firm—Greer, Burns & Crain, Ltd.

(57) ABSTRACT

A seat belt retractor includes a mechanism cover and a spring cover which are assembled through a spool and mounted in a frame. The spool has a two-stepped tooth formation which enables operation of a vehicle sensing element without separate rachet parts.

7 Claims, 7 Drawing Sheets

(C)

SEAT BELT RETRACTOR FOR VEHICLES

FIELD OF INVENTION

The present invention relates to a lightweight and economical retractor for a seat belt of a vehicle, and more particularly to a retractor having a structure in which the number of parts necessary for incorporating a webbing sensing element and a vehicle sensing element is reduced.

BACKGROUND

In a conventional seat belt assembly for use in a motor vehicle, a seat belt for binding the user's body is drawn out of a retractor which is fixedly located typically next to one side of a seat in the vehicle, and fastened to a buckle mounted on the other side of the seat. The retractor prevents the seat belt from being drawn out of the retractor when the user's upper body is unexpectedly propelled forward, as when the vehicle is involved in a collision.

In conventional seat belt retractors having double sensing elements, namely a vehicle sensing element and a webbing sensing element, separate covers are used to protect and/or house these elements, requiring more parts and increasing the size of the overall seat belt assembly. A large number of parts delay the operation time of the retractor to lock the seat belt into a desired length in the event of collision, as the required action is transmitted through the numerous parts of separately housed sensing elements.

SUMMARY OF THE INVENTION

The present invention relates to an effective and economical seat belt retractor for vehicles which reduces the number of parts and size of the retractor by incorporating a vehicle sensing element and an webbing sensing element in a mechanism cover and a spring cover.

DETAILED DESCRIPTION OF THE INVENTION

Figure 1:
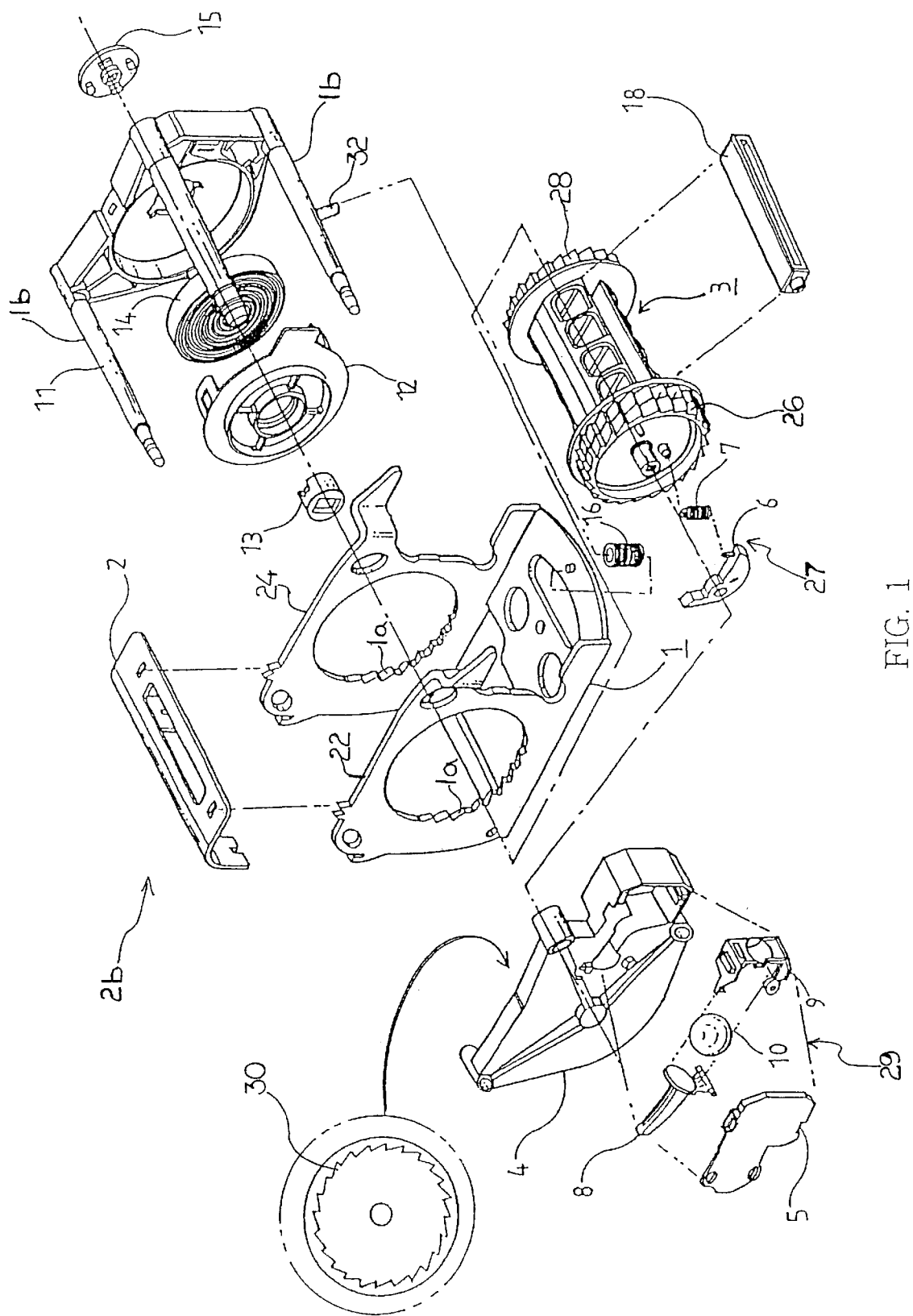
FIG. 1 is an exploded perspective view illustrating a seat belt retractor for vehicles in accordance with an embodiment of the present invention.

Turning now to FIG. 1, a seat belt retractor 20 of the present invention includes a mechanism cover 4 and a spring cover 11 which are cooperatively assembled with a spool 3, including an inertia disc 6 and a sensor spring 7, and mounted in a frame 1. The frame 1 is provided with eight divisions of a tooth formation 1a on both sides 22, 24, with the third division in the counterclockwise direction being 16.5°, and the remainder being 15°. The spool 3 has a two-stepped tooth formation 26 on one side for engaging the tooth formation 1a of the frame 1, and also for operating a vehicle sensing element 27 without using a separate rachet.

Figure 2:
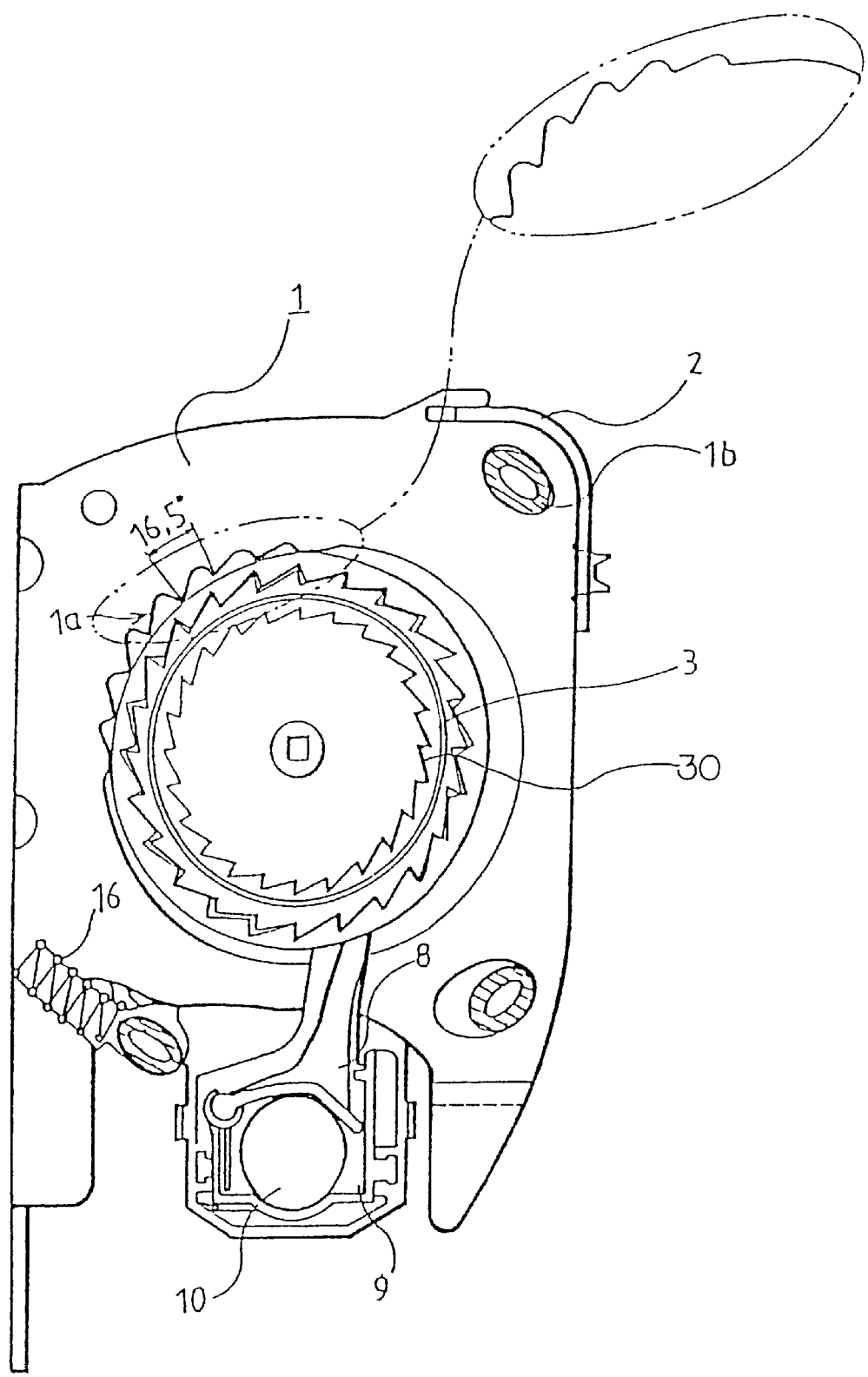
FIG. 2 is a side view of the retractor of FIG. 1 with parts removed for clarity.

The spring cover 11 includes three oval pivot points 1b (best shown in FIG. 2).

The retractor 20 according to the present invention adopts a double sensing method, which includes the webbing sensing element 27 and a vehicle sensing element 29 in the frame 1. The retractor 20 also includes a double locking type binding on both sides of the spool 3, i.e., the spool 3 includes the two-stepped tooth formation 26 on one side and a binding tooth formation 28 on the other side for engaging the corresponding tooth formations 1a on the sides 22, 24 of the frame 1. This not only reduces the number of parts, but also improves the effects of binding power in comparison with conventional retractors which typically only provide binding on one side of the frame.

Turning now to FIG. 2 and in accordance with an embodiment of the present invention, tip to tip or paging phenomenon is prevented when the spool 3 is rotated, by varying the divisions of the tooth formation 1a (for example, seven divisions to be 15° and one division to be 16.5°). The paging phenomenon occurs generally when the tips of the opposing gears or teeth make contact, and thus, prevent the gears or teeth from engaging properly in alternating fashion. By providing one tooth that has a different dimension from the rest of the teeth, the tip to tip correspondence between the opposing teeth are interrupted, thereby enabling the opposing teeth to properly engage each other. Moreover, the spring cover 11 is provided with oval pivot points 1b, which allow the mechanism cover 4 to rotatively move about the pivot point and securely placed into the frame 1.

Figure 3:
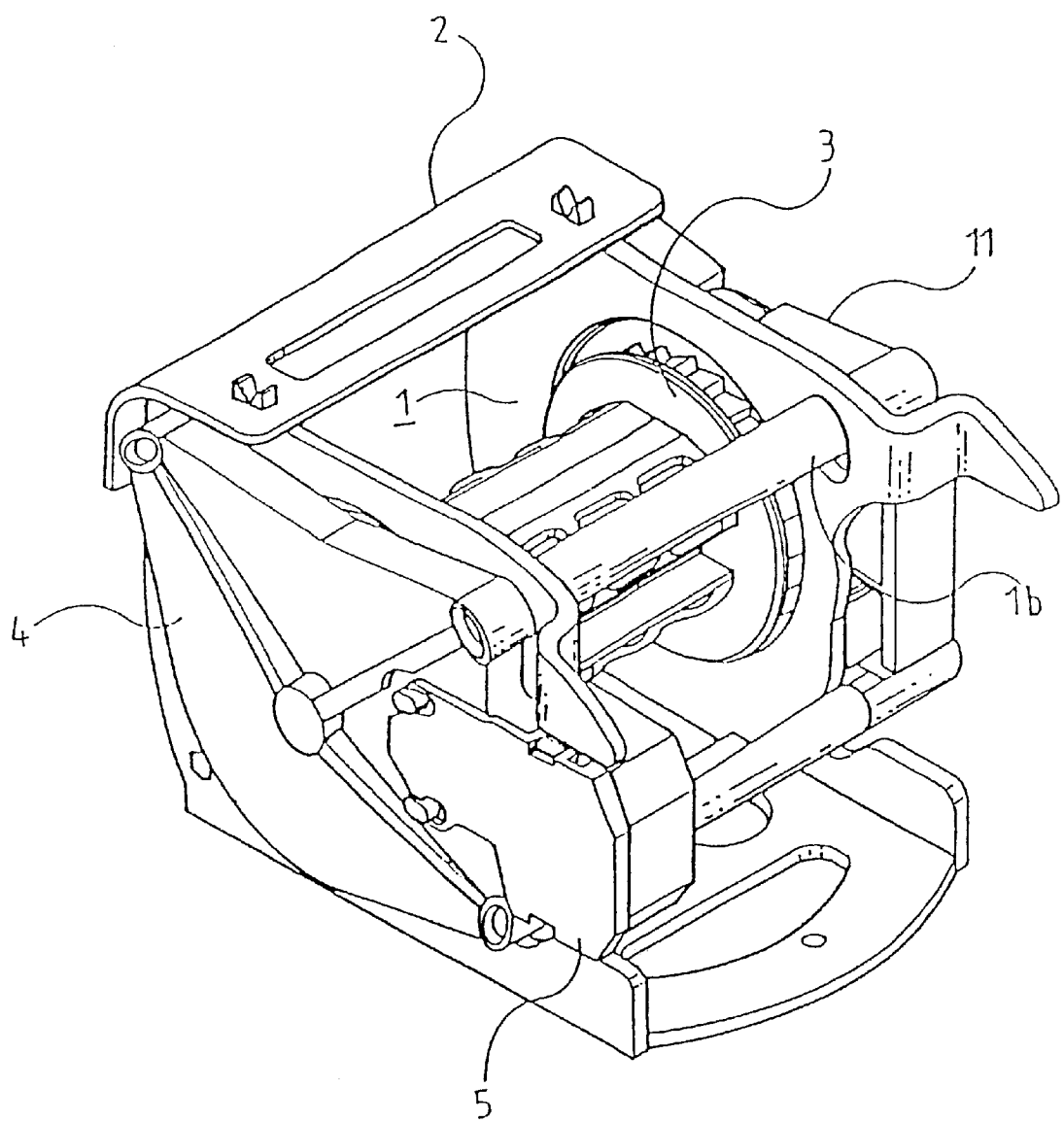
FIG. 3 is an assembled perspective view of the retractor shown in FIG. 1.

Turning now to FIGS. 3 and 1, a tie bar 2 is mounted between the two sides 22, 24 to prevent deformation of the frame 1, and a webbing guide 18 is mounted to the spool 3 to prevent twisting of the spool 3 when the webbing(not shown in drawings) is drawn out, and to prevent webbing wear and friction due to contact with the frame 1. A sharp bent portion 38 is provided on both sides 22, 24 of the frame to protect against a drop, shock or collision. In an area defined by the two-stepped tooth formation 26 of the spool 3, the inertia disc 6 and a sensor spring 7 are assembled and operated as the webbing sensing element 27, which is one sensing element of the double sensing methods. The inertia disc 6 is engaged with a tooth formation 30 which is fixedly formed within the mechanism cover 4, and guides locking of the spool 3 to the frame 1 in such a state that rotation of the spool 3 is prevented. The sensor spring 7 performs smooth calibration of the inertia disc 6. On one side 22 of the frame 1, the mechanism cover 4 housing the two-stepped tooth formation 26 of the spool 3 in which the inertia disc 6 and the sensor spring 7 are provided, is mounted.

Turning to FIGS. 1 and 2 the vehicle sensing element 29 is engaged with the spool 3 and guides the tooth formations 26, 28 of the spool 3 to be accurately placed into the tooth formations 1a of the frame 1. In a sensor housing 9 supporting the vehicle sensing element 8, four places of edge are formed to satisfy tilt lock and acceleration sensing and to prevent rattle noise. Accordingly, the sensor housing 9 is engaged with one side of the mechanism cover 4, and inside the housing 9, the vehicle sensing lever 8 and a sensor ball 10 are engaged and operated as the vehicle sensing element 29.

In the frame 1 in which the spool 3 is mounted, the mechanism cover 4 and the spring cover 11 are assembled, and on the tooth formation 28 side of the spool 3 in the spring cover 11, an arbor 13, a spring sheet 12 and a retraction spring 14 are assembled in sequence, and are fastened with a cover cap 15. The spring cover 11 includes three oval pivot point 1b and the spool 3 is placed into the middle of the pivot points. The spring cover 11 is assembled with the mechanism cover 4 through the frame 1 and a stopper is mounted to reduce tolerance when the mechanism cover 4 is assembled. Accordingly, the oval pivot points 1b have efficiency with respect to reduced friction effects due to point contact and control of tolerance and dimension.

The arbor 13 applies two places of the fixed grooves of a spring hook portion as miller image so as to assemble with the retraction spring 14. A reset spring 16 supports a middle position 32 of the spring cover 11 and places the retractor 20 into an operation position, in which the spool 3 is not locked to frame 1 and a draw-out of the webbing is maintained in a free state.

Figure 4:
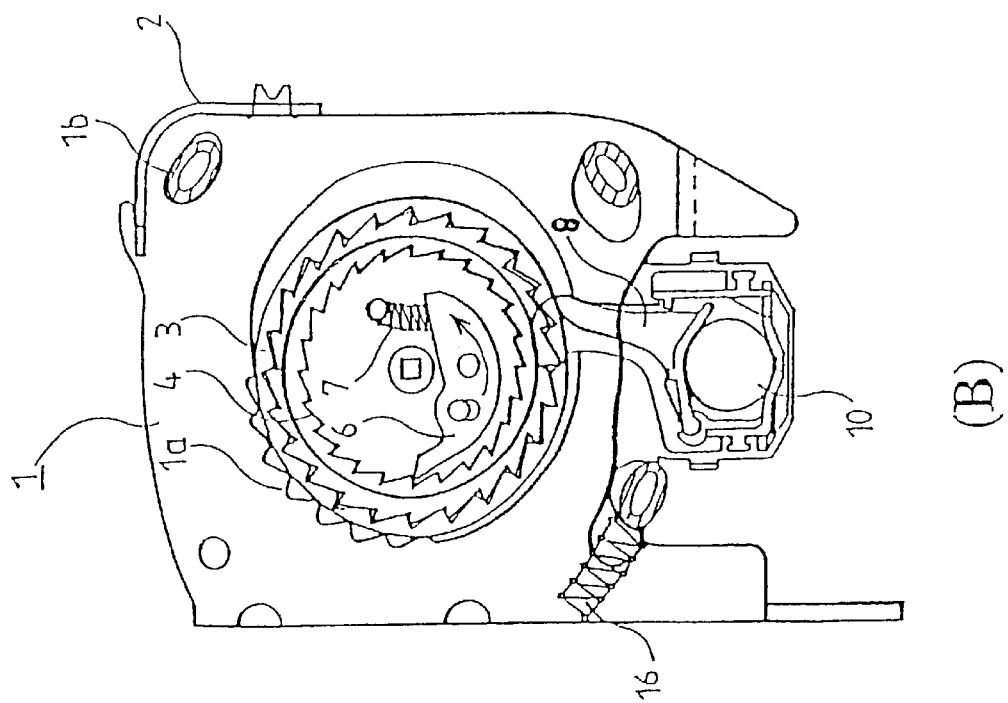
FIGS. 4A–4D are views illustrating the operation of a webbing sensing element of the retractor for vehicles according to the present invention.
Figure 4:
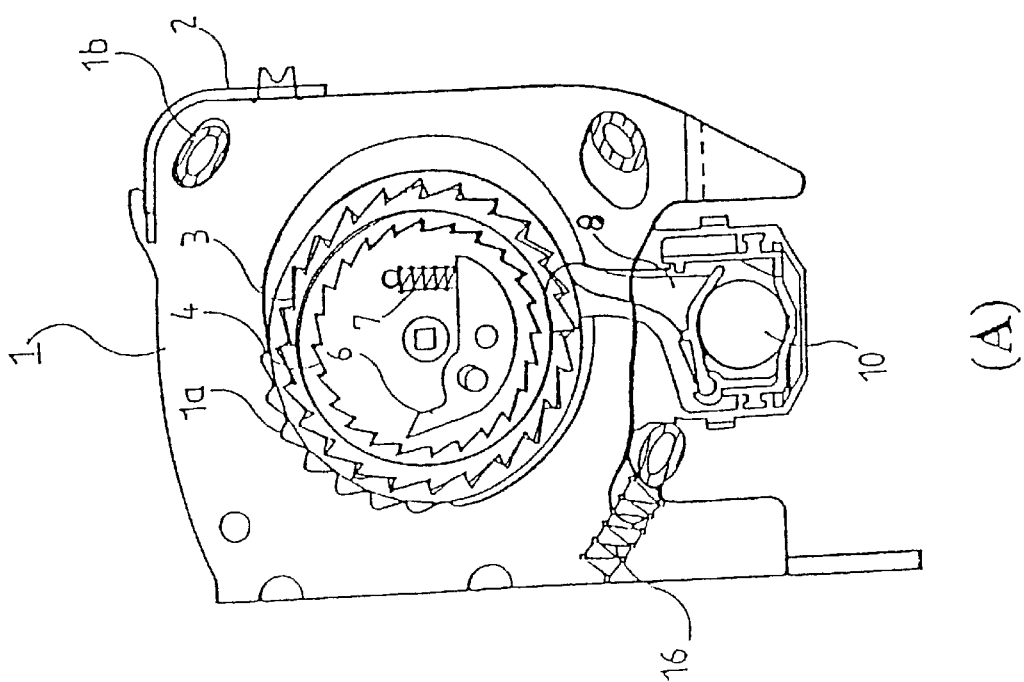
Figure 4:
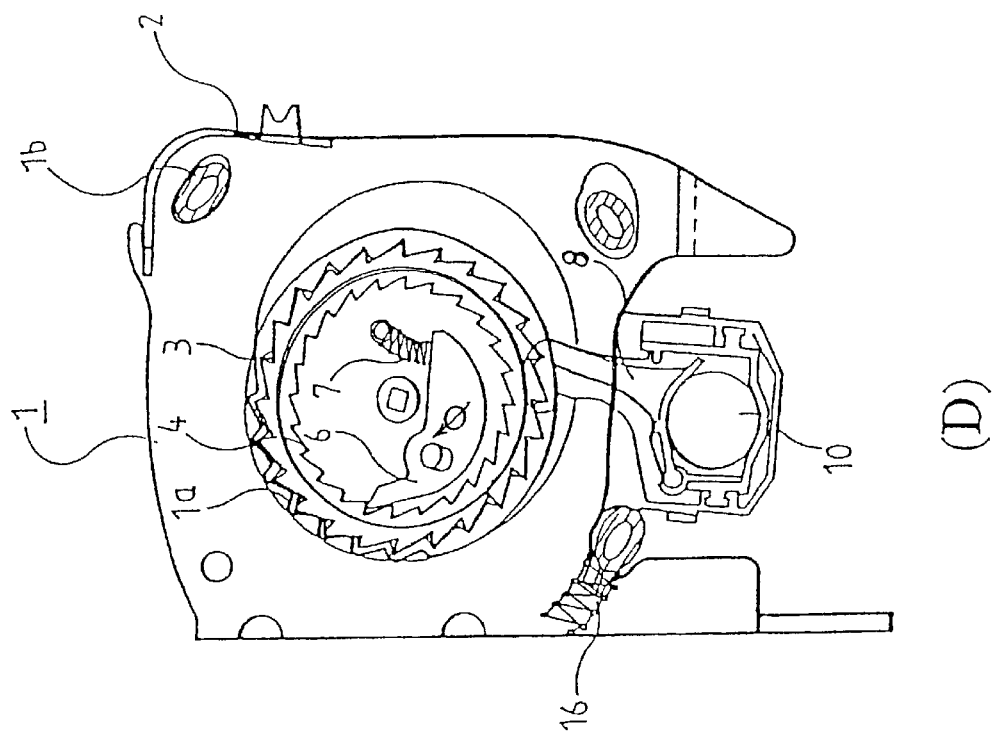
Figure 4:
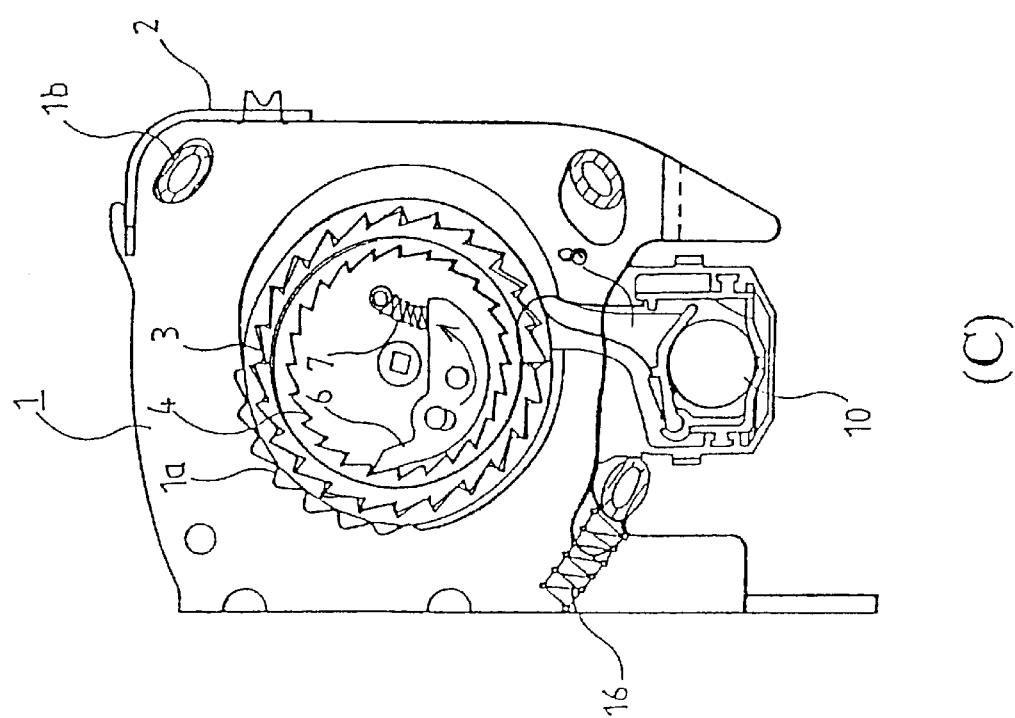

FIGS. 4A–4D are views illustrating the state of the webbing sensing element 27 representing the operation of the retractor 20 for vehicles according to the present invention. In order for the tooth formation 1a of the frame 1, the tooth formations 26, 28 of the spool 3 and the tooth formation 30 in the mechanism cover 4 to be engaged, the inertia disc 6 and the sensor spring 7 mounted to the two-stepped tooth formation 26 side of the spool 3 are operated. Namely, FIG. 4(A) shows that at the threshold of less than 1.0 g, the inertia disc 6 and the sensor spring 7 in the spool 3 are in a stable state. FIG. 4(B) shows that at the threshold of more than 1.0 g, the inertia disc 6 in the spool 3 rotates in a reverse direction (counterclockwise direction) of the rotation of the spool 3 (clockwise direction) and at the same time, the sensor spring 7 is compressed, and thus, the inertia disc 6 is inserted into the tooth formation 30 in the mechanism cover 4.

As shown in FIG. 4(C), the inertia disc 6 in the spool 3 is gradually rotated in the counter clockwise direction and the sensor spring 7 becomes compressed and locked, and is thus engaged with the tooth formation 30 in the mechanism cover 4. As shown in FIG. 4(D), rotation of the spool 3 is in a suspended state, but by means of the force applied by the webbing to the spool 3, the spring cover 11 is rotated about the pivot points 1b in a clockwise direction, and the tooth formations 26, 28 of the spool 3 are engaged with the tooth formation 1a of the frame 1 to prevent draw-out of the webbing.

Figure 5:
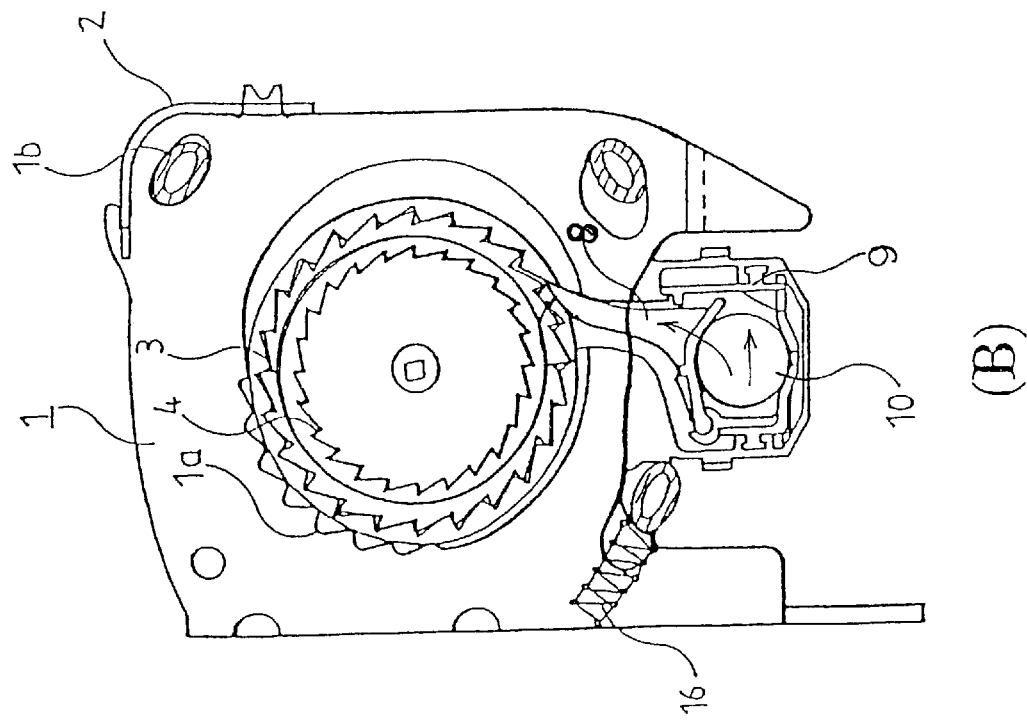
FIGS. 5A–5C are views illustrating operation of a vehicle sensing element of the retractor for vehicles according to the present invention.
Figure 5:
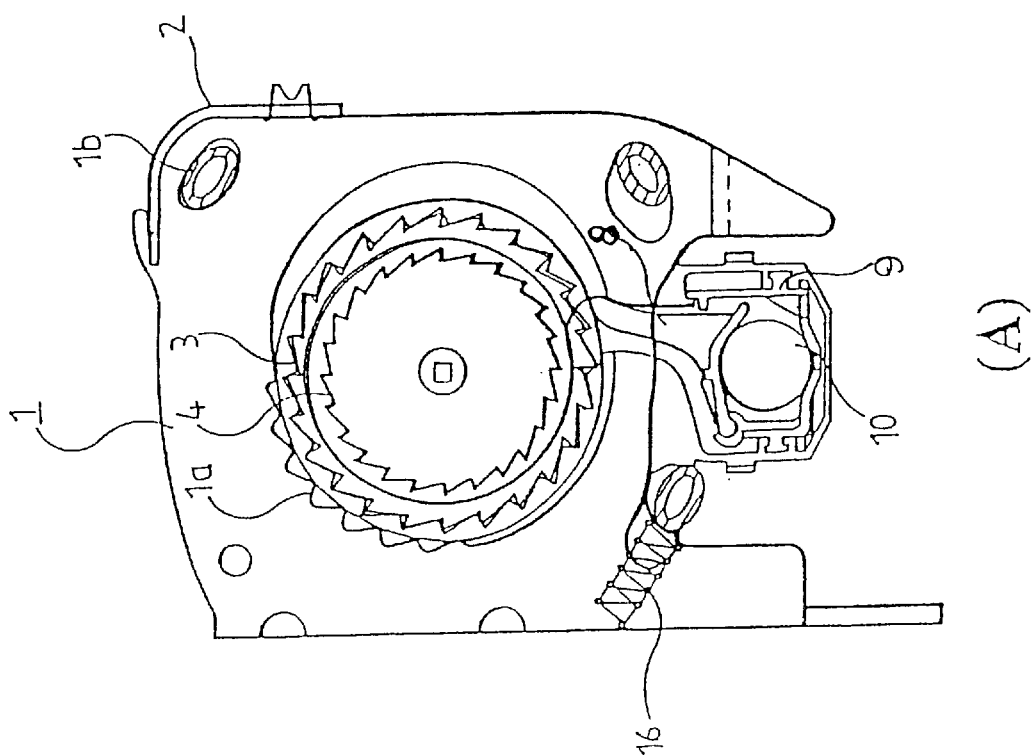
Figure 5:
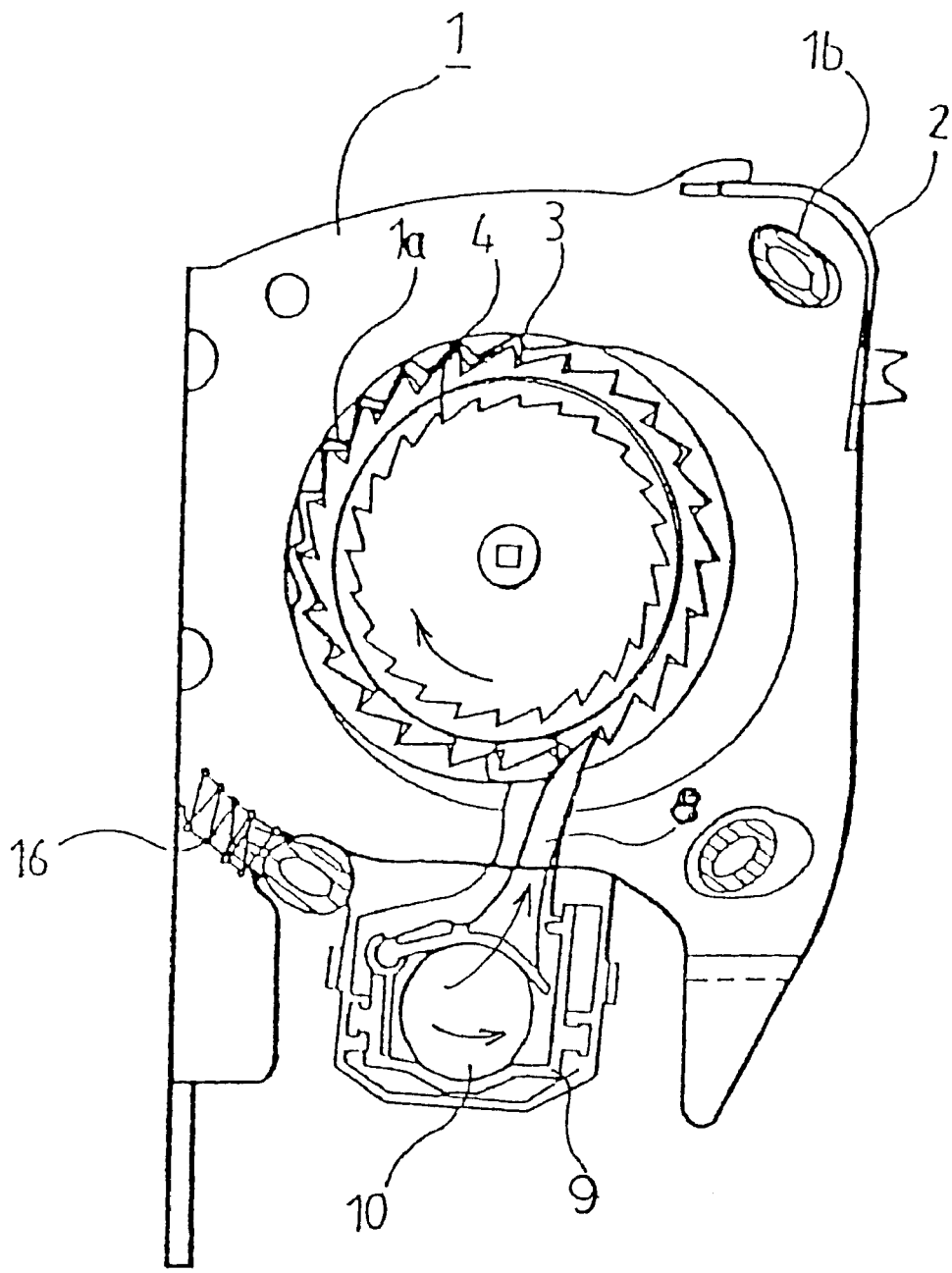

FIGS. 5A–5C are views illustrating the state of the vehicle sensing element 29 representing the operation of the retractor 20 for vehicles according to the present invention. In order for the tooth formation 1a of the frame 1, the tooth formations 26, 28 of the spool 3 and the tooth formation 30 in the mechanism cover 4 to be engaged, the vehicle sensing lever 8 and the sensor ball 10 of the sensor housing 9 in the mechanism cover 4 are operated. FIG. 5(A) shows that in a normal state, the sensor ball 10 of the sensor housing 9 is placed into the hollow portion of the sensor housing 9 and thus the webbing is freely drawn out.

In the meantime, when the vehicle body (not shown) is in an acceleration or deceleration state, the sensor ball 10 of the sensor housing 9 moves as shown in FIG. 5(B) and lifts up the vehicle sensing lever 8 to be engaged with the two-stepped tooth formation 26 of the spool 3. Accordingly, as shown in FIG. 5(C), rotation of the spool 3 is in a suspended state, but by means of the force applied by the webbing to the spool 3, the spring cover 11 is rotated about the pivot points 1b in a clockwise direction, and both tooth formations 26, 28 of the spool 3 are engaged with the tooth formation 1a of the frame 1 to perform the operation of the vehicle sensing element 29.

What is claimed is:

1. A seat belt retractor for vehicles comprising:
   a rotatable spool with a first set of tooth formations thereon;
   a mechanism cover and a spring cover operatively engaging and housing said spool;
   an inertia disc and a sensor spring operatively connected to said spool; and
   a frame for pivotally mounting said spring cover thereon, said frame including a second set of tooth formations, where said second set of tooth formations are configured and arranged to cooperate with said first set of tooth formations;
   wherein said frame prevents tip to tip phenomenon because said second set of tooth formations include seven tooth formations defined between eight projections, where seven of said eight tooth formations are defined by a 15° arc and said eight tooth formation is defined by a 16.5° arc, where said 16.5° arc tooth formation is positioned with two of said 15° arc tooth formations on one side and four of said 15° arc tooth formations on the other side thereof, and further wherein said spool operates a vehicle sensing element without rachet parts by forming a two-stepped tooth formation on one side, and said spring cover includes a plurality of oval pivot points.

2. A retractor for vehicles as set forth in claim 1, wherein said inertia spring and said sensor spring are mounted adjacent said two-stepped tooth formation of the spool.

3. A retractor for vehicles as set forth in claim 1, wherein said vehicle sensing element includes a sensor lever, and a sensor ball provided in a sensor housing in said mechanism cover 4.

4. A retractor for vehicles as set forth in claim 1, wherein said spring cover is engaged with the mechanism cover and mounted to said frame without separate fixing tools.

5. A retractor for vehicles as set forth in claim 1, wherein a sharply bent portion is formed on both sides of the frame to protect against drop or shock from outside.

6. A retractor for vehicles as set forth in claim 1, wherein a reset spring is placed on said spring cover so as to maintain the balance of said retractor when said retractor is being operated.

7. A retractor for vehicles as set forth in claim 1, wherein a tooth formation is formed in said mechanism cover so that said inertia disc can be sensed for locking with said tooth formation.

* * * * *